US008638852B2

(12) United States Patent
Karczewicz et al.

(10) Patent No.: US 8,638,852 B2
(45) Date of Patent: Jan. 28, 2014

(54) VIDEO CODING OF FILTER COEFFICIENTS BASED ON HORIZONTAL AND VERTICAL SYMMETRY

(75) Inventors: Marta Karczewicz, San Diego, CA (US); Yan Ye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 789 days.

(21) Appl. No.: 12/348,752

(22) Filed: Jan. 5, 2009

(65) Prior Publication Data

US 2009/0175336 A1    Jul. 9, 2009

Related U.S. Application Data

(60) Provisional application No. 61/019,831, filed on Jan. 8, 2008.

(51) Int. Cl.
*H04N 11/02* (2006.01)

(52) U.S. Cl.
USPC .................................. 375/240.12; 375/240.16

(58) Field of Classification Search
USPC .......................... 375/240.12, 240.16, E07.076
See application file for complete search history.

(56) References Cited

U.S. PATENT DOCUMENTS

| | | | |
|---|---|---|---|
| 6,175,599 B1 * | 1/2001 | Lyon et al. .................... | 375/261 |
| 6,332,043 B1 | 12/2001 | Ogata | |
| 6,973,127 B1 | 12/2005 | Kolesnik et al. | |
| 2003/0074381 A1 * | 4/2003 | Awad et al. .................... | 708/322 |
| 2003/0138154 A1 | 7/2003 | Suino | |
| 2003/0160899 A1 | 8/2003 | Ngai et al. | |
| 2003/0165197 A1 | 9/2003 | Greenfield et al. | |
| 2003/0169931 A1 | 9/2003 | Lainema | |
| 2003/0219073 A1 | 11/2003 | Lee et al. | |
| 2005/0147319 A1 * | 7/2005 | Deshpande et al. .......... | 382/268 |
| 2005/0207664 A1 | 9/2005 | Ramasastry et al. | |
| 2005/0244076 A1 | 11/2005 | Ratakonda et al. | |
| 2006/0285019 A1 * | 12/2006 | Matschullat .................. | 348/667 |
| 2008/0247467 A1 * | 10/2008 | Rusanovskyy et al. .. | 375/240.16 |

FOREIGN PATENT DOCUMENTS

| | | |
|---|---|---|
| EP | 1359763 A2 | 11/2003 |
| EP | 1603338 A1 | 12/2005 |
| EP | 1765021 A2 | 3/2007 |
| EP | 1841230 A1 | 10/2007 |

(Continued)

OTHER PUBLICATIONS

Taiwan Search Report—TW098100526—TIPO—May 23, 2012.

(Continued)

*Primary Examiner* — Hassan Phillips
*Assistant Examiner* — Saba Tsegaye
(74) *Attorney, Agent, or Firm* — Steven Thiel; Brent Boyd

(57) ABSTRACT

This disclosure recognizes and exploits the fact that some of the filter coefficients defined at the encoder may possess symmetry relative to other filter coefficients. Accordingly, this disclosure describes techniques in which a first set of the filter coefficients are used to predictively encode a second set of the filter coefficients, thereby exploiting any symmetry between filter coefficients. Rather than communicate all of the filter coefficients to the decoding device, the encoding device may communicate the first set of filter coefficients and difference values associated with the second set of filter coefficients. Using this information, the decoder may be able to reconstruct all of the filter coefficients. In some cases, if exact symmetry is imposed, the need to send the difference values may be eliminated and the decoder may be able to derive the second set of filter coefficients from the first set of filter coefficients.

64 Claims, 9 Drawing Sheets

(56) References Cited

FOREIGN PATENT DOCUMENTS

| EP | 1845729 A1 | 10/2007 |
|---|---|---|
| JP | 4230584 A | 8/1992 |
| JP | 8163561 A | 6/1996 |
| JP | 9046707 A | 2/1997 |
| JP | 11145839 A | 5/1999 |
| JP | 2004023666 A | 1/2004 |
| JP | 2005514872 A | 5/2005 |
| JP | 2006211152 A | 8/2006 |
| JP | 2007288810 A | 11/2007 |
| KR | 20040075348 | 8/2004 |
| KR | 20100045549 A | 5/2010 |
| RU | 2154918 C1 | 8/2000 |
| RU | 2302707 C2 | 7/2007 |
| WO | WO9844637 A1 | 10/1998 |
| WO | WO0143285 A2 | 6/2001 |
| WO | WO03058945 A2 | 7/2003 |
| WO | WO2006108654 A2 | 10/2006 |
| WO | WO2008069073 A1 | 6/2008 |
| WO | WO2009110160 A1 | 9/2009 |

OTHER PUBLICATIONS

Ugur K. et al., "Adaptive Interpolation Filter with Flexible Symmetry for Coding High Resolution High Quality Video", Acoustics, Speech and Signal Processing, 2007. ICASSP, 2007 IEEE International Conference on vol. 1, Apr. 15-20, 2007, pp. 1-1013.

Wedi T., "Adaptive Interpolation Filter for Motion Compensated Hybrid Video Coding", Picture Coding Symposium (PCS 2001), Seoul, Korea, Apr. 2001.

International Search Report and Written Opinion —PCT/US2009/030468—ISA/EPO—May 11, 2011.

Karczewicz M., et al., "Post-filter applicability to intra coding" 33. VCEG Meeting; 83. MPEG Meeting; Jan. 12, 2008-Jan. 13, 2008; Antalya; (Video Coding Experts Group of ITU-T SG.16), No. VCEG-AH26, Jan. 9, 2008, XP030003564 the whole document.

Nasser Kehtarnavaz Ed—Kehtarnavaz et al: "Fixed-Point vs. Floating-Point", Jan. 1, 2005, Real-Time Digital Signal Processing Based on the TMS320C6000, Amsterdam [U.A.]: Elsevier Newnes, NL, p. 117-139, XP008135010, ISBN: 0-7506-7830-5.

* cited by examiner

TRANSMIT FILTER COEFFICIENTS FOR QUADRANT Q1

TRANSMIT DIFFERENCE VALUES FOR QUADRANTS Q2, Q3 and Q4

TRANSMIT FILTER COEFFICIENTS FOR QUADRANTS Q1 and Q2

TRANSMIT DIFFERENCE VALUES FOR QUADRANTS Q3 and Q4

TRANSMIT FILTER COEFFICIENTS FOR QUADRANTS Q1 and Q3

TRANSMIT DIFFERENCE VALUES FOR QUADRANTS Q2 and Q4

VIDEO CODING OF FILTER COEFFICIENTS BASED ON HORIZONTAL AND VERTICAL SYMMETRY

This application claims the benefit of U.S. Provisional Application No. 61/019,831 filed on Jan. 8, 2008, the entire content of which is incorporated herein by reference.

TECHNICAL FIELD

This disclosure relates to block-based digital video coding used to compress video data and, more particularly, techniques for coding filter coefficients associated with the filtering of video blocks.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or ITU-T H.264/MPEG-4, Part 10, Advanced Video Coding (AVC), to transmit and receive digital video more efficiently. Video compression techniques perform spatial and temporal prediction to reduce or remove redundancy inherent in video sequences.

Block-based video compression techniques generally perform spatial prediction and/or temporal prediction. Intra-coding relies on spatial prediction to reduce or remove spatial redundancy between video blocks within a given coded unit, which may comprise a video frame, a slice of a video frame, or the like. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of corresponding video blocks of two or more adjacent coded units.

A coded video block may be represented by prediction information that can be used to create or identify a predictive block, and a residual block of data indicative of differences between the block being coded and the predictive block. In the case of inter-coding, one or more motion vectors are used to identify the predictive block of data, while in the case of intra-coding, the prediction mode can be used to generate the predictive block. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process.

After block-based prediction coding, the video encoder may apply transform, quantization and entropy coding processes to further reduce the bit rate associated with communication of a residual block. Transform techniques may comprise discrete cosine transforms or conceptually similar processes, such as wavelet transforms, integer transforms, or other types of transforms. In a discrete cosine transform (DCT) process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

Filtering of video blocks may be applied as part of the encoding and decoding loops, or as part of a post-filtering process on reconstructed video blocks. Filtering is commonly used, for example, to reduce blockiness or other artifacts common to block-based video coding. Filter coefficients (sometimes called filter taps) may be defined or selected in order to promote desirable levels of video block filtering that can reduce blockiness and/or improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth differences in intensity of adjacent pixel values in order to help eliminate unwanted artifacts.

SUMMARY

In general, this disclosure describes techniques that can reduce the amount of data needed to encode and convey filter information from an encoding device to a decoding device. For each coded unit (such as a frame, slice, group of pictures, or other coded unit), the encoder may define or select filter coefficients to be applied to the video blocks of that coded unit. The filter coefficients may be applied by the encoder in order to filter video blocks of reconstructed video units used for predictive coding, and may also be similarly applied by the decoder to improve output video quality. In this case, however, information may need to be sent from the encoder to the decoder so that the decoder will apply the correct filter coefficients during the filtering process. In particular, the filter coefficients applied by the decoder should be the same as those applied by the encoder.

This disclosure recognizes and exploits the fact that some of the filter coefficients defined at the encoder may possess horizontal and/or vertical symmetry relative to other filter coefficients. Accordingly, in order to reduce the amount of data needed to convey such filter coefficients from an encoding device to a decoding device, this disclosure describes techniques in which a first set of the filter coefficients are used to predictively encode a second set of the filter coefficients, thereby exploiting horizontal and/or vertical symmetry that may exist between filter coefficients. Rather than communicate all of the filter coefficients to the decoding device, the encoding device may communicate the first set of filter coefficients and difference values associated with the second set of filter coefficients. Using this information, the decoder may be able to reconstruct all of the filter coefficients. In this way, improvements in data compression may be achieved relative to techniques that communicate all of the filter coefficients from the encoder to the decoder. Additional examples are also described in which the decoder may presume that the encoder applied filter coefficients that have perfect symmetry, in which case difference values associated with the second set of filter coefficients may be presumed to be zero. In this case, a decoder may apply sign changes to the first set of filter coefficients in order to generate the second set of filter coefficients.

In one example, this disclosure provides a method of encoding video data. The method comprises encoding a unit of the video data, the unit including a plurality of video blocks. The method also includes selecting filter coefficients for filtering the video blocks of the unit of the video data, and generating difference values associated with a second set of the filter coefficients based on a first set of the filter coefficients.

In another example, this disclosure provides a method of decoding video data. The method comprises receiving an encoded bitstream, the encoded bitstream comprising an encoded unit of the video data including a plurality of video blocks, and filter information comprising a first set of filter coefficients and difference values associated with a second set of filter coefficients. The method also includes decoding the plurality video blocks, generating the second set of filter coefficients based on the first set of filter coefficients and the difference values, and filtering the decoded plurality of video blocks based on the first and second sets of filter coefficients.

In another example, this disclosure provides apparatus that encodes video data. The apparatus comprises a predictive coding unit that encodes a unit of the video data, the unit of the video data including a plurality of video blocks. The apparatus also comprise a filter unit that selects filter coefficients for filtering the video blocks of the unit of the video data, and generates difference values associated with a second set of the filter coefficients based on a first set of the filter coefficients.

In another example, this disclosure provides an apparatus that decodes video data. The apparatus comprises a unit that receives an encoded bitstream, the encoded bitstream comprising an encoded unit of the video data including a plurality of video blocks, and filter information comprising a first set of filter coefficients and difference values associated with a second set of filter coefficients. The apparatus also comprises a prediction unit that decodes the plurality video blocks, and a filter unit that generates the second set of filter coefficients based on the first set of filter coefficients and the difference values, and filters the decoded plurality of video blocks based on the first and second sets of filter coefficients.

In another example, this disclosure provides a device that encodes video data, the device comprising means for encoding a unit of the video data, the unit including a plurality of video blocks, means for selecting filter coefficients for filtering the video blocks of the unit of the video data, and means for generating difference values associated with a second set of the filter coefficients based on a first set of the filter coefficients.

In another example, this disclosure provides a device that decodes video data, the device comprising means for receiving an encoded bitstream, the encoded bitstream comprising an encoded unit of the video data including a plurality of video blocks, and filter information comprising a first set of filter coefficients and difference values associated with a second set of filter coefficients, means for decoding the plurality video blocks, means for generating the second set of filter coefficients based on the first set of filter coefficients and the difference values, and means for filtering the decoded plurality of video blocks based on the first and second sets of filter coefficients.

In another example, this disclosure provides a device comprising a predictive coding unit that encodes a unit of the video data, the unit of the video data including a plurality of video blocks, a filter unit that selects filter coefficients for filtering the video blocks of the unit of video data, and generates difference values associated with a second set of the filter coefficients based on a first set of the filter coefficients, and a wireless transmitter that transmits an encoded bitstream that includes the first set of the filter coefficients and the difference values associated with a second set of the filter coefficients.

In another example, this disclosure provides a device comprising a wireless receiver that receives an encoded bitstream comprising an encoded unit of video data including a plurality of video blocks, and filter information comprising a first set of filter coefficients and difference values associated with a second set of filter coefficients, an entropy coding unit that receives the encoded bitstream from the wireless receiver and decodes the bitstream to generate the plurality of video blocks and the filter information, a prediction unit that decodes the plurality video blocks, and a filter unit that generates the second set of filter coefficients based on the first set of filter coefficients and the difference values, and filtering the decoded plurality of video blocks based on the first and second sets of filter coefficients.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to encode video data, wherein the instructions cause the device to encode a unit of the video data, the unit including a plurality of video blocks, select filter coefficients for filtering the video blocks of the unit of the video data, and generate difference values associated with a second set of the filter coefficients based on a first set of the filter coefficients.

In addition, this disclosure also contemplates a computer-readable medium comprising instructions that upon execution in a video coding device cause the device to decode video data, wherein the instructions cause the device to receive an encoded bitstream, the encoded bitstream comprising an encoded unit of the video data including a plurality of video blocks, and filter information comprising a first set of filter coefficients and difference values associated with a second set of filter coefficients, decode the plurality video blocks, generate the second set of filter coefficients based on the first set of filter coefficients and the difference values, and filter the decoded plurality of video blocks based on the first and second sets of filter coefficients.

In yet another example, this disclosure provides a method of decoding video data, the method comprising receiving an encoded bitstream, the encoded bitstream comprising an encoded unit of the video data including a plurality of video blocks, and filter information comprising a first set of filter coefficients, decoding the plurality video blocks, generating a second set of filter coefficients based on the first set of filter coefficients, and filtering the decoded plurality of video blocks based on the first and second sets of filter coefficients.

In another example, this disclosure provides an apparatus that decodes video data. In this case, the apparatus comprises a unit that receives an encoded bitstream, the encoded bitstream comprising an encoded unit of the video data including a plurality of video blocks, and filter information comprising a first set of filter coefficients, a predictive coding unit that decodes the plurality video blocks, and a filter unit that generates a second set of filter coefficients based on the first set of filter coefficients, and filters the decoded plurality of video blocks based on the first and second sets of filter coefficients.

In another example, this disclosure provides a device comprising means for receiving an encoded bitstream, the encoded bitstream comprising an encoded unit of the video data including a plurality of video blocks, and filter information comprising a first set of filter coefficients, means for decoding the plurality video blocks, means for generating a second set of filter coefficients based on the first set of filter coefficients, and means for filtering the decoded plurality of video blocks based on the first and second sets of filter coefficients.

In another example, this disclosure provides a computer-readable medium comprising instructions that upon execution cause a decoding device to receive an encoded bitstream, the encoded bitstream comprising an encoded unit of the video data including a plurality of video blocks, and filter information comprising a first set of filter coefficients, decode the plurality video blocks, generate a second set of filter coefficients based on the first set of filter coefficients, and filter the decoded plurality of video blocks based on the first and second sets of filter coefficients.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes techniques that can reduce the amount of data needed to encode and convey filter information from an encoding device to a decoding device. For each coded unit (such as a frame, slice, group of pictures, or other coded unit), the encoder may define or select filter coefficients to be applied to the video blocks of that coded unit. The filter coefficients may be applied by the encoder in order to filter video blocks of reconstructed video units used for predictive coding, and may also be similarly applied by the decoder to improve output video quality. Information can be sent from the encoder to the decoder so that the decoder will apply the correct filter coefficients during the filtering process.

The techniques of this disclosure recognize and exploit the fact that some of the filter coefficients defined at the encoder may possess horizontal and/or vertical symmetry relative to other filter coefficients. Accordingly, in order to reduce the amount of data needed to convey such filter coefficients, this disclosure describes techniques in which a first set of the filter coefficients are used to predictively encode a second set of the filter coefficients, thereby exploiting any horizontal and/or vertical symmetry between filter coefficients. Rather than communicate all of the filter coefficients to the decoding device, the encoding device may communicate the first set of filter coefficients and difference values associated with the second set of filter coefficients.

The difference values may define the differences in absolute magnitude between filter coefficients in the first set and filter coefficients in the second set, and may also identify differences in sign between filter coefficients in the first and second sets. Using this information, the decoder may be able to reconstruct all of the filter coefficients. In this way, improvements in data compression may be achieved relative to techniques that communicate all of the filter coefficients from the encoder to the decoder.

Figure 1:
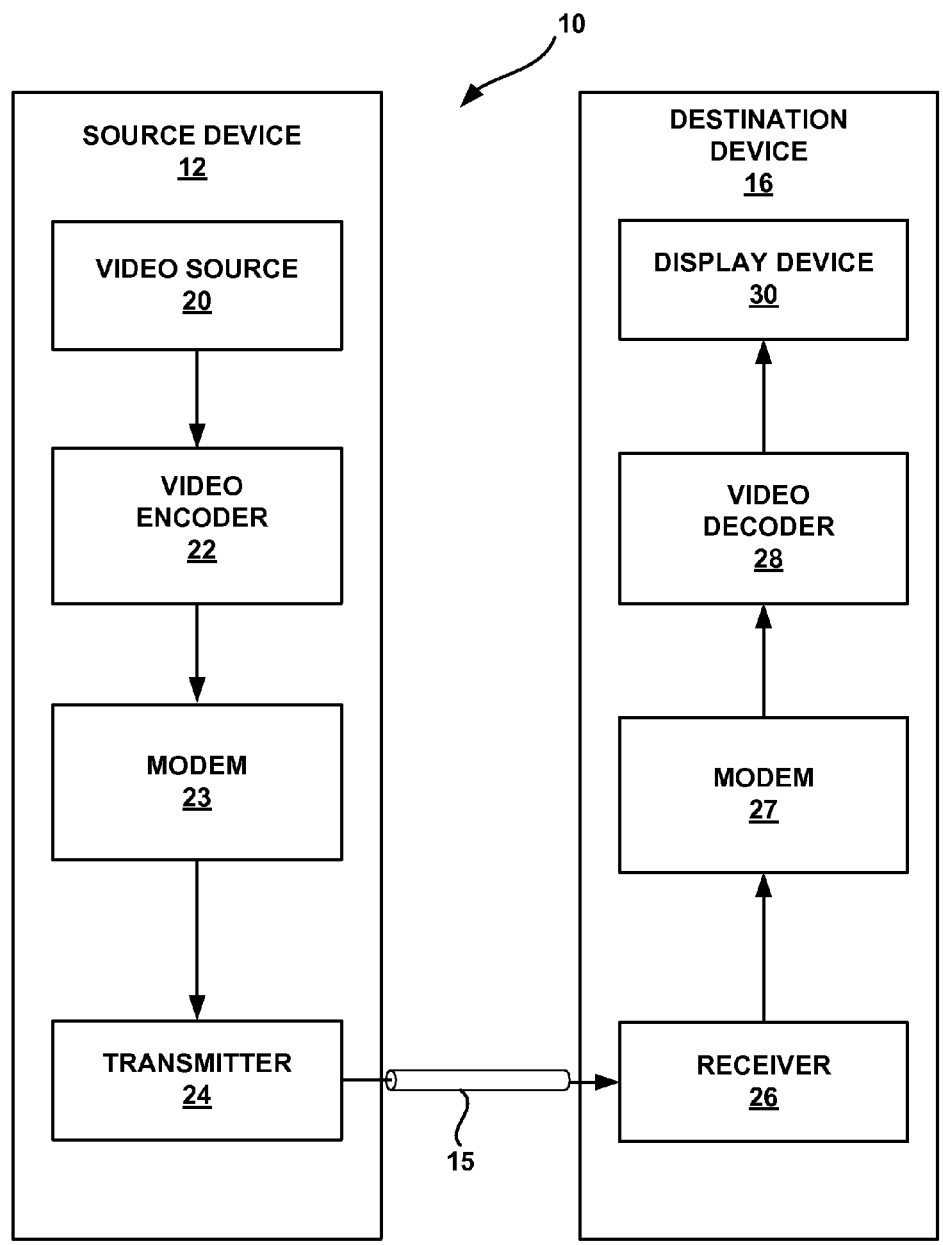
FIG. 1 is an exemplary block diagram illustrating a video encoding and decoding system.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply more generally to video block filtering, are not necessarily limited to wireless applications or settings, and may be applied to non-wireless devices including video encoding and/or decoding capabilities.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to select filter coefficients for a video block filtering process, and then predictively encode some of filter coefficients based on other filter coefficients. Video decoder 28 of destination device 16 may be configured to decode the filter coefficients, e.g., by reconstructing the predictively encoded filter coefficients.

More specifically, video encoder 22 of source device 12 may select filter coefficients, apply such filter coefficients during the encoding process, and then encode the filter coefficients for communication to video decoder 28 of destination device 16. Given similarities between different filter coefficients, a second set of the filter coefficients can be predictively coded as difference values relative to a first set of the filter coefficients. For example, filter coefficients in the second set may have magnitudes similar to those of the filter coefficients in the first set. The signs of the filter coefficients in the second set (e.g., positive or negative) may differ from those of the filter coefficients in the first set. Accordingly, difference values may identify such differences in sign, as well as any differences in absolute magnitude. In this way, the amount of information needed to convey the filter coefficients can be reduced. Generally, in this disclosure, the phrase "difference values" can refer to differences in absolute magnitude, differences in sign, or differences in magnitude and sign.

The illustrated system 10 of FIG. 1 is merely exemplary. The filtering techniques of this disclosure may be performed by any encoding or decoding devices. Source device 12 and destination device 16 are merely examples of coding devices that can support such techniques.

Video encoder 22 of source device 12 may encode video data received from video source 20 using the techniques of this disclosure. Video source 20 may comprise a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

Once the video data is encoded by video encoder 22, the encoded video information may then be modulated by modem 23 according to a communication standard, e.g., such as code division multiple access (CDMA) or another communication standard or technique, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. The video decoding process performed by video decoder 28 may include filtering, e.g., as part of the in-loop decoding or as a post filtering step following the decoding loop. Either way, the filter coefficients applied by video decoder 28 may be decoded using the techniques of this disclosure. Again, similarities between different filter coefficients may be exploited to reduce the amount of information conveyed over channel 15. In particular, a second set of the filter coefficients can be predictively coded as difference values relative to a first set of the filter coefficients. In this case, video decoder 28 receives an encoded bitstream comprising vide blocks and filter information that includes the first set of filter coefficients and difference values associated with the second set of filter coefficients.

Video decoder 28 decodes the video blocks, generates the second set of filter coefficients based on the first set of filter coefficients and the difference values, and filters the decoded video blocks based on the first and second sets of filter coefficients. The decoded and filtered video blocks can assembled into video frames to form decoded video. Display device 28 displays the decoded video data to a user, and may comprise any of a variety of display devices such as a cathode ray tube (CRT), a liquid crystal display (LCD), a plasma display, an organic light emitting diode (OLED) display, or another type of display device.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate according to a video compression standard such as the ITU-T H.264 standard, alternatively referred to as MPEG-4, Part 10, Advanced Video Coding (AVC). However, the techniques of this disclosure may be readily applied to any of a variety of other video coding standards. Specifically, any standard that allows for filtering at the encoder and decoder may benefit from the teaching of this disclosure by reducing the amount of data needed to communicate filter information from the encoder to the decoder.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

During the encoding process, video encoder 22 may execute a number of coding techniques or steps. In general, video encoder 22 operates on video blocks within individual video frames (or other independently coded units such as slices) in order to encode the video blocks. Frames, slices, portions of frames, groups of pictures, or other data structures may be defined as independently decodable units that include a plurality of video blocks. The video blocks within coded units may have fixed or varying sizes, and may differ in size according to a specified coding standard. In some cases, each video frame may include a series of independently decodable slices, and each slice may include a series of macroblocks, which may be arranged into even smaller blocks.

Macroblocks typically refer to 16 by 16 blocks of data. The ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. In this disclosure, the phrase "video blocks" refers to any size of video block. Moreover, video blocks may refer to blocks of video data in the pixel domain, or blocks of data in a transform domain such as a discrete cosine transform (DCT) domain, a domain similar to DCT, a wavelet domain, or the like.

Video encoder 22 may perform predictive coding in which a video block being coded is compared to a predictive frame (or other coded unit) in order to identify a predictive block. The differences between the current video block being coded and the predictive block are coded as a residual block, and prediction syntax is used to identify the predictive block. The residual block may be transformed and quantized. Transform techniques may comprise a DCT process or conceptually similar process, integer transforms, wavelet transforms, or other types of transforms. In a DCT process, as an example, the transform process converts a set of pixel values into transform coefficients, which may represent the energy of the pixel values in the frequency domain. Quantization is typically applied to the transform coefficients, and generally involves a process that limits the number of bits associated with any given transform coefficient.

Following transform and quantization, entropy coding may be performed on the quantized and transformed residual video blocks. Syntax elements, such as the filter information and prediction vectors defined during the encoding, may also be included in the entropy coded bitstream. In general, entropy coding comprises one or more processes that collectively compress a sequence of quantized transform coefficients and/or other syntax information. Scanning techniques, such as zig-zag scanning techniques, are performed on the quantized transform coefficients in order to define one or more serialized one-dimensional vectors of coefficients from two-dimensional video blocks. The scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded in order to generate the video data used for subsequent prediction-based coding of subsequent video blocks. At this stage, filtering may be employed in order to improve video quality, and e.g., remove blockiness artifacts from decoded video.

The encoder may select filter coefficients in a manner that promotes the video quality. Such filter coefficients may be selected from pre-defined sets of coefficients, or may be adaptively defined to promote video quality. As an example, video encoder 22 may select or define a set of filter coefficients for a given coded unit such that the same filter coefficients are used for all video blocks of that coded unit. In some cases, video encoder 22 may apply several sets of filter coefficients and select the set that produces the best quality video or the highest levels of compression. In any case, once selected, the set of filter coefficients applied by video encoder 22 for each coded unit may need to be encoded and communicated to video decoder 28 of destination device 18 so that video decoder 28 can apply the same filtering that was applied during the encoding process for each given coded unit.

Figure 2:
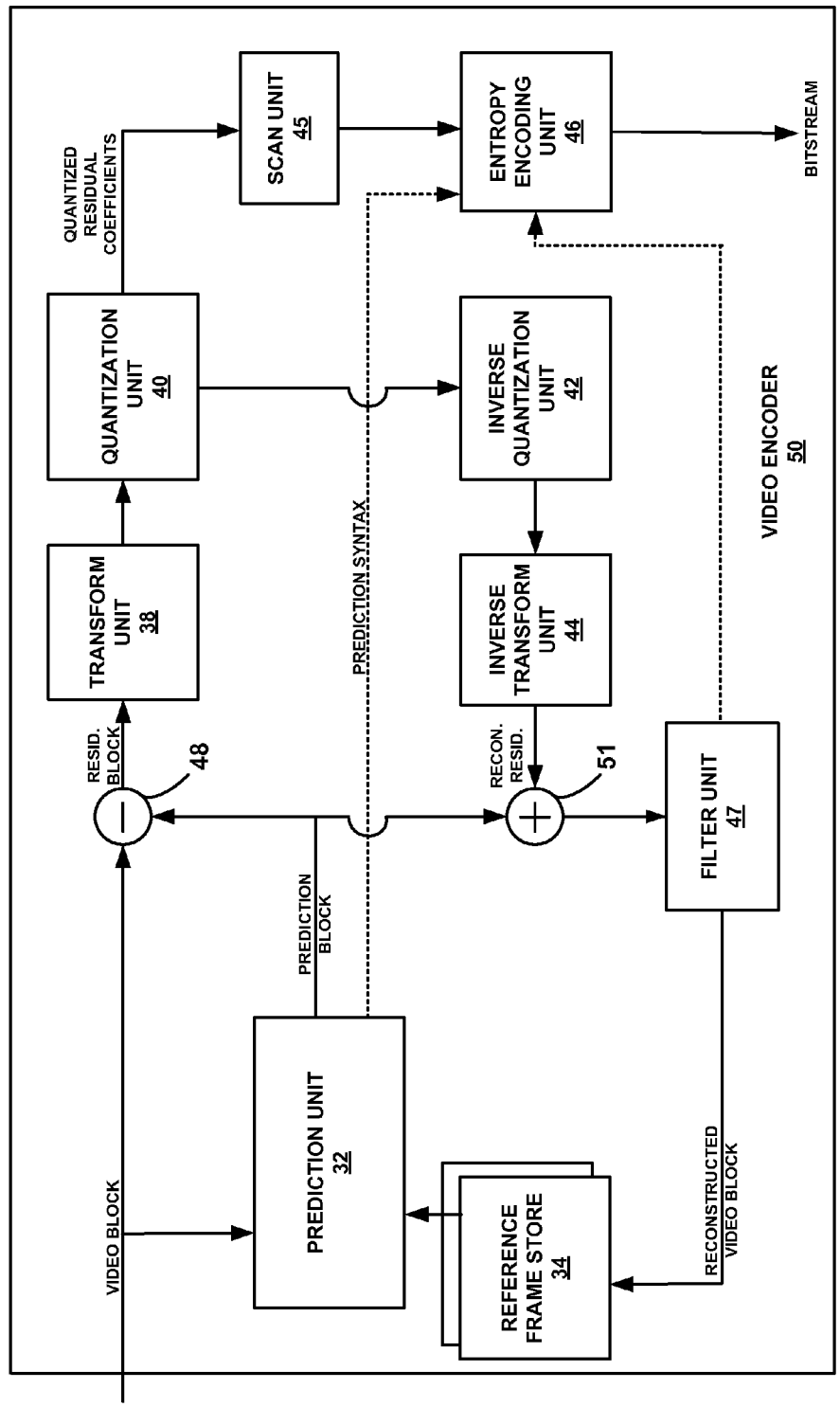
FIG. 2 is a block diagram illustrating an exemplary video encoder consistent with this disclosure.

FIG. 2 is a block diagram illustrating a video encoder 50 consistent with this disclosure. Video encoder 50 may correspond to video encoder 22 of device 20, or a video encoder of a different device. As shown in FIG. 2, video encoder 50 includes a prediction unit 32, adders 48 and 51, and a reference frame storage element 34. Video encoder 50 also includes a transform unit 38 and a quantization unit 40, as well as an inverse quantization unit 42 and an inverse transform unit 44. Video encoder 50 also includes a scan unit 45 and an entropy coding unit 46. Filter unit 47 of video encoder 50 may perform filtering, and may encode filter information according to this disclosure so that the filter information can be efficiently communicated to another device.

During the encoding process, video encoder 50 receives a video block to be coded, and prediction unit 32 performs predictive coding techniques. For inter coding, prediction unit 32 compares the video block to be encoded to various blocks in one or more video reference frames or slices in order to define a predictive block. For intra coding, prediction unit 32 generates a predictive block based on neighboring data within the same coded unit. Prediction unit 32 outputs the prediction block and adder 48 subtracts the prediction block from the video block being coded in order to generate a residual block.

For inter coding, prediction unit 32 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. For intra coding, prediction unit 32 generates a predictive block based on neighboring data within the same coded unit. One or more intra-prediction modes may define how an intra prediction block can be defined.

After prediction unit 32 outputs the prediction block and adder 48 subtracts the prediction block from the video block being coded in order to generate a residual block, transform unit 38 applies a transform to the residual block. The transform may comprise a discrete cosine transform (DCT) or a conceptually similar transform such as that defined by the H.264 standard. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 then quantizes the residual transform coefficients to further reduce bit rate. Quantization unit 40, for example, may limit the number of bits used to code each of the coefficients. After quantization, scan unit 45 scans the quantized coefficient block from a two-dimensional representation to one or more serialized one-dimensional vectors. The scan order may be pre-programmed to occur in a defined order (such as zig-zag scanning or another pre-defined order), or possibly adaptive defined based on previous coding statistics.

Following this scanning process, entropy encoding unit 46 encodes the quantized transform coefficients (along with any syntax elements) according to an entropy coding methodology, such as CAVLC or CABAC, to further compress the data. Syntax elements included in the entropy coded bitstream may include prediction syntax from prediction unit 32, such as motion vectors for inter coding or prediction modes for intra coding. Syntax elements included in the entropy coded bitstream may also include filter information from filter unit 47, which can be encoded in the manner described herein.

CAVLC is one type of entropy coding technique supported by the ITU H.264/MPEG4, AVC standard, which may be applied on a vectorized basis by entropy coding unit 46. CAVLC uses variable length coding (VLC) tables in a manner that effectively compresses serialized "runs" of transform coefficients and/or syntax elements. CABAC is another type of entropy coding technique supported by the ITU H.264/MPEG4, AVC standard, which may be applied on a vectorized basis by entropy coding unit 46. CABAC may involve several stages, including binarization, context model selection, and binary arithmetic coding. In this case, entropy coding unit 46 codes transform coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding unit 46, the encoded video may be transmitted to another device or archived for later transmission or retrieval. Again, the encoded video may comprise the entropy coded vectors and various syntax, which can be used by the decoder to properly configure the decoding process. Inverse quantization unit 42 and inverse transform unit 44 apply inverse quantization and inverse transform, respectively, to reconstruct the residual block in the pixel domain. Summer 51 adds the reconstructed residual block to the prediction block produced by prediction unit 32 to produce a reconstructed video block for storage in reference frame store 34. Prior to such storage, however, filter unit 47 may apply filtering on the video block to improve video quality. Such filtering by filter unit 47 may reduce blockiness or other artifacts. Moreover, filtering may improve compression by generating predictive video blocks that comprise close matches to video blocks being coded. After filtering, the reconstructed video block may be used by prediction unit 32 as a reference block to inter-code a block in a subsequent video frame or other coded unit.

The filtering by filter unit 47 may include filter coefficient selection in a manner that promotes the video quality. For example, filter unit 47 may select filter coefficients from pre-defined sets of coefficients, or may adaptively define the filter coefficients in order to promote video quality or improved compression. Filter unit 47 may select or define a set of filter coefficients for a given coded unit such that the same filter coefficients are used for all video blocks of that coded unit. In some cases, filter unit 47 may apply several sets of filter coefficients and select the set that produces the best quality video or the highest levels of compression. In any case, once selected, the set of filter coefficients applied by filter unit 47 for each coded unit may need to be encoded and communicated to a decoding device.

In accordance with this disclosure, filter unit 47 performs coding techniques with respect to filter information that may reduce the amount of data needed to encode and convey filter information from encoder 50 to another device. Again, for each coded unit (such as a frame, a group of pictures, a slice or other coded unit), filter unit 37 may define or select filter coefficients to be applied to the video blocks of that coded unit. Filter unit 37 applies the filter coefficients in order to filter video blocks of reconstructed video blocks stored in reference frame store 34, which may be used for predictive coding. Filter unit can encode the filter coefficients as filter information, which is forwarded to entropy coding unit 46 for inclusion in the encoded bitstream.

The techniques of this disclosure recognize and exploit the fact that some of the filter coefficients defined or selected by filter unit 47 may possess horizontal and/or vertical symmetry relative to other filter coefficients. Accordingly, in order to reduce the amount of data needed to convey such filter coefficients, filter unit 47 predictively encodes a second set of the filter coefficients based on a first set of the filter coefficients, exploiting any horizontal and/or vertical symmetry between filter coefficients. Thus, the filter information from filter unit 47 to entropy coding unit 46 may include the first set of filter coefficients and difference values associated with the second set of filter coefficients. The difference values may define the differences in magnitude and possibly differences in sign between filter coefficients in the first set and filter coefficients in the second set. Using this information, the decoder may be able to reconstruct all of the filter coefficients. In this way, improvements in data compression may be achieved relative to techniques that communicate all of the filter coefficients from video encoder 50 to another device.

Figure 3:
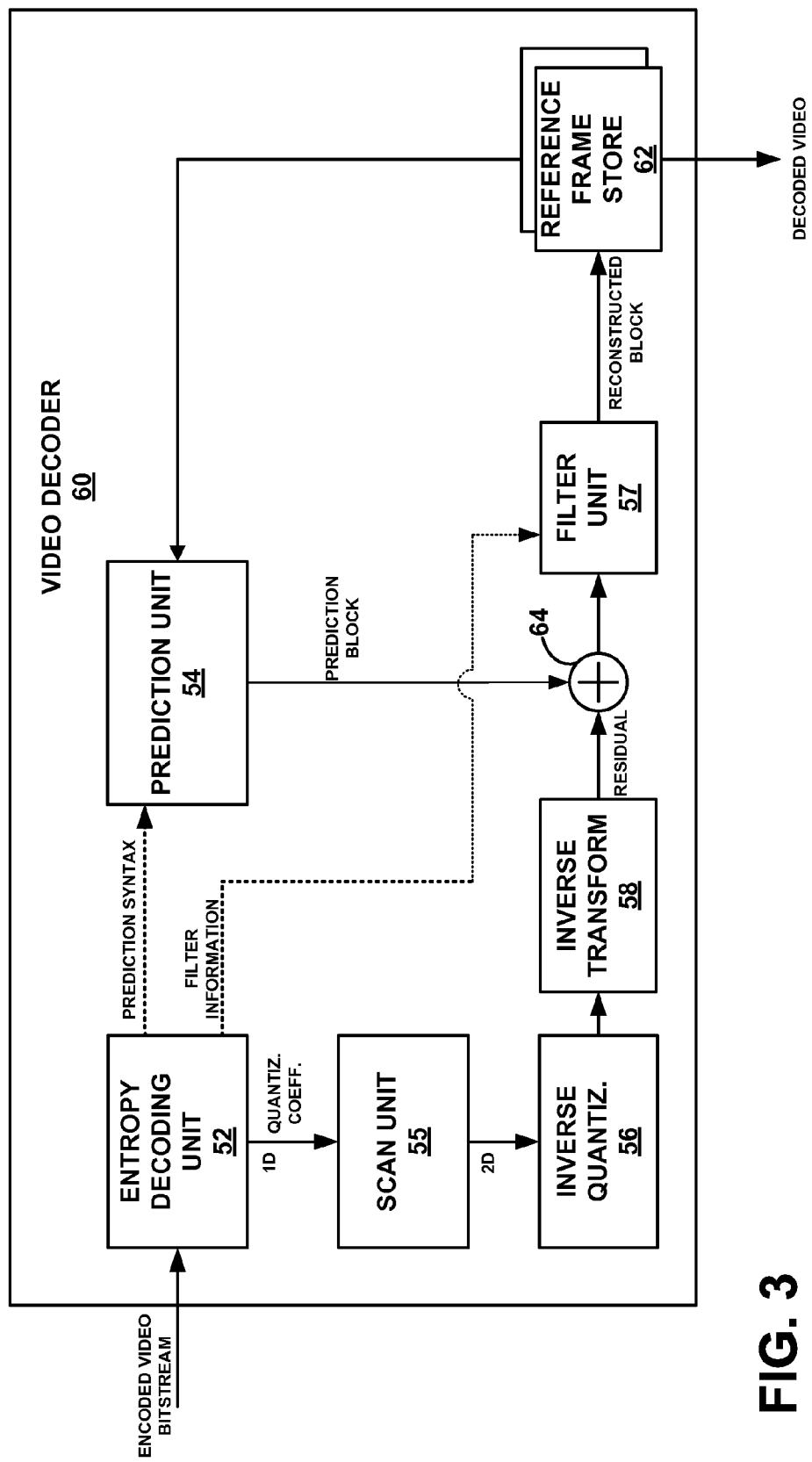
FIG. 3 is a block diagram illustrating an exemplary video decoder consistent with this disclosure.

FIG. 3 is a block diagram illustrating an example of a video decoder 60, which decodes a video sequence that is encoded in the manner described herein. The received video sequence may comprise an encoded set of image fames, a set of frame slices, a commonly coded group of pictures (GOPs), or a wide variety of coded video units that include encoded video blocks and syntax to define how to decode such video blocks.

Video decoder 60 includes an entropy decoding unit 52, which performs the reciprocal decoding function of the encoding performed by entropy encoding unit 46 of FIG. 2. In particular, entropy decoding unit 52 may perform CAVLC or CABAC decoding, or any other type of entropy decoding used by video encoder 50. Entropy decoded video blocks in a one-dimensional serialized format may be forwarded to scan unit 55. Entropy decoded prediction syntax may be sent from entropy decoding unit 52 to prediction unit 54, and entropy decoded filter information may be sent from entropy decoding unit 52 to filter unit 57.

Scan unit 55 performs inverse scanning that is reciprocal to the scanning performed by a scan unit 45 of FIG. 2. In this case, scan unit 55 may convert one or more one-dimensional vectors of coefficients back into a two-dimensional block format. The number and size of the vectors, as well as the scan order defined for the video blocks may define how the two-dimensional block is reconstructed.

Video decoder 60 also includes a prediction unit 54, an inverse quantization unit 56, an inverse transform unit 58, a reference frame store 62, and a summer 64. In addition, video decoder 60 also includes a filter unit 57 that filters the output of summer 64. Consistent with this disclosure, filter unit 57 may receive entropy decoded filter information that includes a first set of filter coefficients and difference values associated with a second set of filter coefficients. Filter unit 57 may be configured to generate the second set of filter coefficients based on the first set of filter coefficients and the difference values. Filter unit 57 can then filter decoded video blocks based on the first and second sets of filter coefficients.

Prediction unit 54 receives prediction syntax (such as motion vectors) from entropy decoding unit 52. Using the prediction syntax, prediction unit 54 generates the prediction blocks that were used to code video blocks. Inverse quantization unit 56 performs inverse quantization, and inverse transform unit 58 performs inverse transforms to change the coefficients of the residual video blocks back to the pixel domain. Adder 64 combines each prediction block with the corresponding residual block output by inverse transform unit 58 in order to reconstruct the video block.

Filter unit 57 generates the filter coefficients to be applied for each coded unit, and then applies such filter coefficients in order to filter the reconstructed video blocks of that coded unit. The filtered video blocks are accumulated in reference frame store 62 in order to reconstruct decoded frames (or other decodable units) of video information. The decoded units may be output from video decoder 60 for presentation to a user, but may also be stored for use in subsequent predictive decoding.

Figure 4:
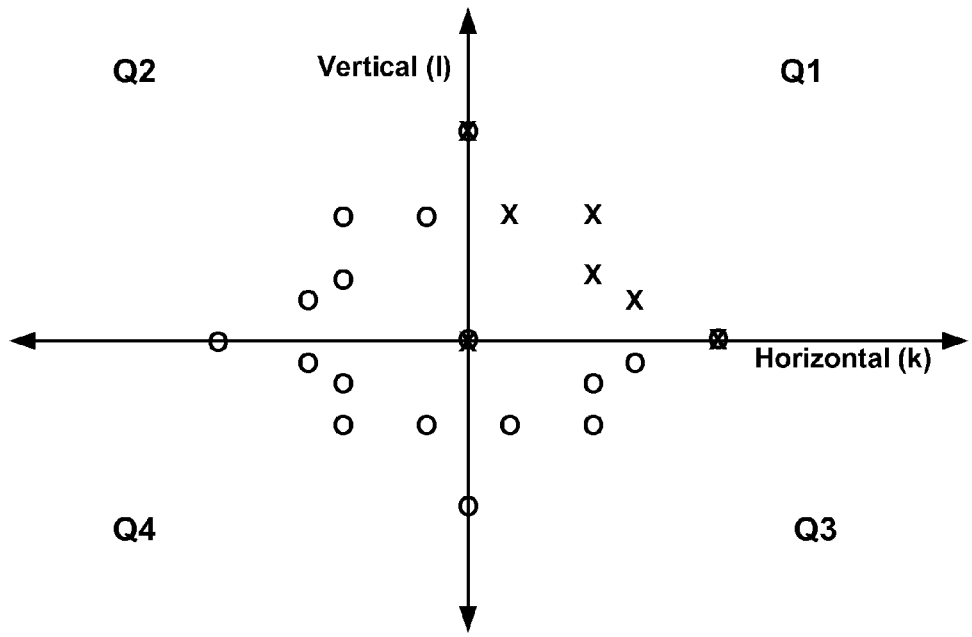
FIGS. 4-6 are conceptual graphs conceptually illustrating exemplary filter coefficients that may possess horizontal and/or vertical symmetry relative to other filter coefficients.
Figure 5:
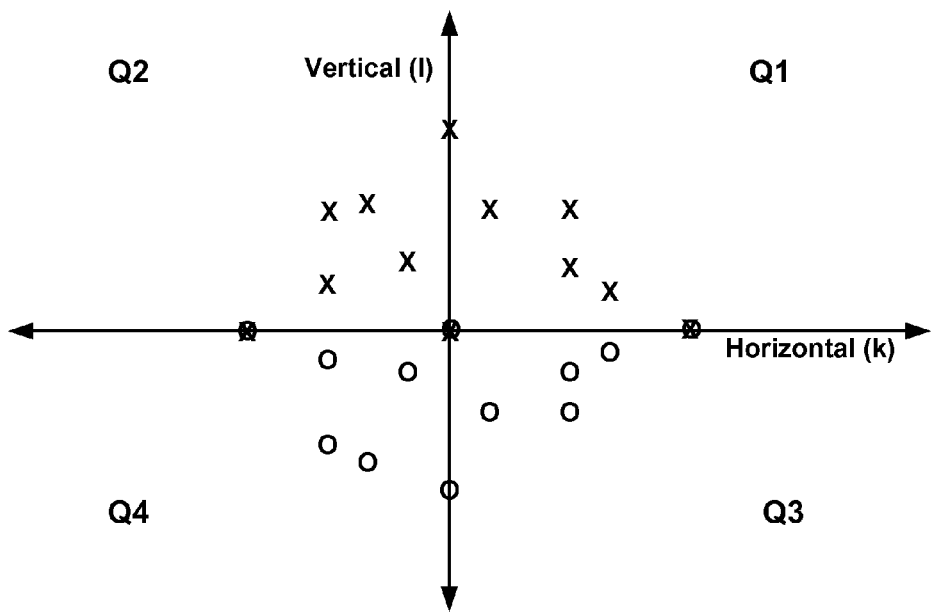
Figure 6:
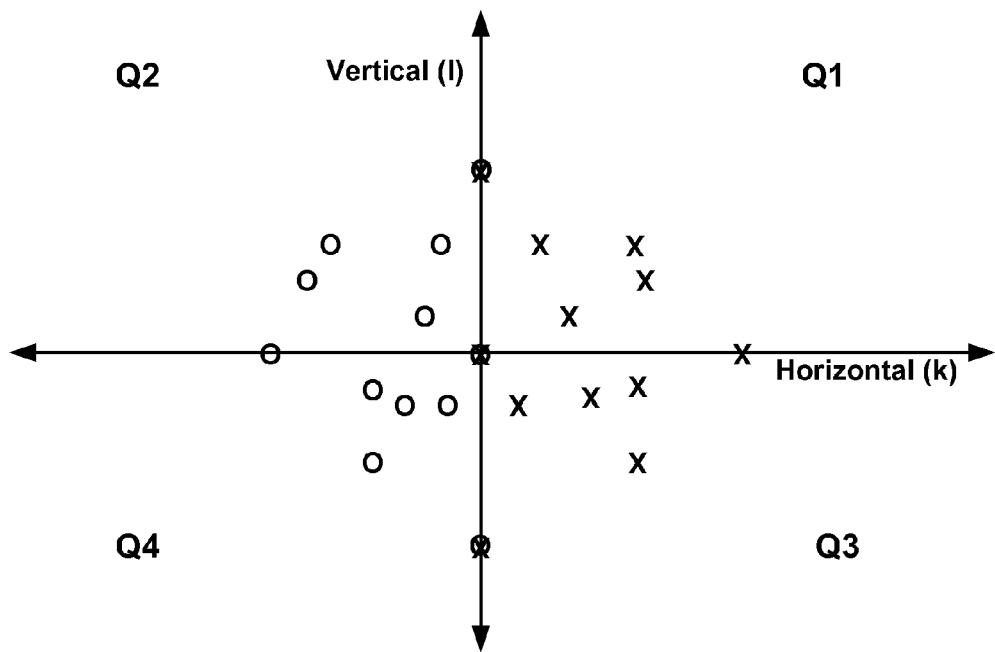

FIGS. 4-6 are conceptual graphs conceptually illustrating exemplary filter coefficients that may possess horizontal and/or vertical symmetry relative to other filter coefficients. The techniques of this disclosure exploit such horizontal and/or vertical symmetry between different filter coefficients in order to reduce the amount of data needed to convey filter coefficients from a video encoder to a video decoder. In particular, rather than communicate all of the filter coefficients, the techniques of this disclosure communicate a first set of the filter coefficients and difference values associated with a second set of the filter coefficients. The difference values may be indicative of differences between the first set of the filter coefficients and the second set of filter coefficients, e.g., differences in magnitude and sign. In this way, the second set of filter coefficients are predictively coded based on the first set of filter coefficients.

The difference values may comprise less data than the amount of data that would otherwise need to be sent to communicate the second set of filter coefficients. Accordingly, the techniques of this disclosure may improve data compression associated with encoded video that includes filter coefficients that possess at least some symmetry. In the conceptual examples of FIGS. 4-6, filter coefficients designated "X" may represent coefficients that are transmitted from the encoding device to the decoding device, while coefficients designated "O" may represent coefficients that are predictively coded such that difference values are transmitted from the encoding device to the decoding device for those coefficients designated "O."

FIG. 4 conceptually illustrates exemplary filter coefficients disposed within a two-dimensional space. The value f(l, k) may represent each filter coefficient such that each coefficient has an "l" component and a "k" component within the two-dimensional l-k space. As shown in FIG. 4, coefficients that reside within quadrant Q1 may possess horizontal, vertical and diagonal symmetry relative to coefficients that reside within quadrants Q2, Q3 and Q4. More specifically, the coefficients in quadrant Q2 may be similar to those of quadrant Q1, but symmetric about the vertical (l) axis. Similarly, the coefficients in quadrant Q3 may be similar to those of quadrant Q1, but symmetric about the horizontal (k) axis. The coefficients in quadrant Q4 may be similar to those of quadrant Q1, but symmetric about the vertical (l) axis and the horizontal (k) axis, which may be referred to as diagonal symmetry. In any case, the filter coefficients in quadrant Q1 may be used to predict the coefficients in quadrants Q2-Q4. Accordingly, an encoding device may transmit filter coefficients for quadrant Q1 and difference values for the coefficients quadrants Q2-Q4 to a decoding device. The decoding device may use the filter coefficients for quadrant Q1 and difference values for quadrants Q2-Q4 to generate the actual coefficients associated with quadrants Q2-Q4. Again, the difference values may comprise less data than the amount of data that would otherwise need to be sent to communicate the second set of filter coefficients. The filter coefficients in quadrant Q1 may comprise approximately a quarter of all of the filter coefficients, while those of quadrants Q2-Q4 may comprise approximately three-quarters of all of the filter coefficients. Overlap may occur along the vertical (l) axis and the horizontal (k) axis In some cases, only vertical symmetry or only horizontal symmetry exists with respect to the filter coefficients within a two-dimensional space. In the conceptual example of FIG. 5, coefficients that reside within quadrants Q1 and Q2 may be similar to those of quadrants Q3 and Q4, but symmetric about the horizontal (k) axis. In this case, the filter coefficients in quadrants Q1 and Q2 may be used to predict the coefficients in quadrants Q3 and Q4. Accordingly, an encoding device may transmit filter coefficients for quadrants Q1 and Q2 and difference values for quadrants Q3 and Q4 to a decoding device. The decoding device may use the filter coefficients for quadrants Q1 and Q2 and difference values for quadrants Q3 and Q4 to generate the actual coefficients associated with quadrants Q3 and Q4. The filter coefficients in quadrants Q1 and Q2 may comprise approximately one half of all of the filter coefficients, and those of quadrants Q3 and Q4 may comprise approximately one-half of all of the filter coefficients. In this case, overlap may occur along the horizontal (k) axis.

In the conceptual example of FIG. 6, coefficients that reside within quadrants Q1 and Q3 may be similar to those of quadrants Q2 and Q4, but symmetric about the vertical (l) axis. In this case, the filter coefficients in quadrants Q1 and Q3 may be used to predict the coefficients in quadrants Q2 and Q4. Accordingly, an encoding device may transmit filter coefficients for quadrants Q1 and Q3 and difference values for quadrants Q2 and Q4 to a decoding device. The decoding device may use the filter coefficients for quadrants Q1 and Q3 and difference values for quadrants Q2 and Q4 to generate the actual coefficients associated with quadrants Q2 and Q4. The filter coefficients in quadrants Q1 and Q3 may comprise approximately one half of all of the filter coefficients, and those of quadrants Q2 and Q4 may comprise approximately one-half of all of the filter coefficients. In this case, overlap may occur along the vertical (l) axis.

In some cases, particular filter coefficients may have more importance to the filtering than other coefficients. In such cases, it may be advantages to code the more important filter coefficients with more bits than the less important filter coefficients. That is, the encoding device may allocate different numbers of bits to different filter coefficients in the first set of the filter coefficients. Often, for example, the filter coefficients that fall on the "l" axis or the "k" axis may be of higher importance to the filtering than the other filter coefficients. In this case, it may be advantages to dedicate more resolution or bandwidth to the filter coefficients that have l or k values of zero and therefore, fall on the "l" axis or the "k" axis.

Generally, a desirable filter (e.g., filter unit 47 of FIG. 2) may be designed by minimizing the error between the original signal and the decoded filtered signal. The coefficients of the filter may be represented as:

$$g(k, l), k=-K, \ldots, K, l=-L, \ldots, L$$

The filter coefficients g(k,l) may then be quantized and represented as:

$$f(k,l) = \text{round}(\text{normFact} \cdot g(k,l))$$

The normFact value represents a normalization factor. The normFact value may be equal to $2^n$ but may assume other normalization values. Larger values of normFact generate more precision such that quantized filter coefficients f(k,l) provide better performance relative to filter coefficients that use smaller values of normFact. On the other hand, larger values of normFact produce coefficients f(k, l) that require more bits to transmit than filter coefficients that use smaller values of normFact.

In the decoder, the decoded filter coefficients f(k,l) are applied to the reconstructed image R(i,j) as follows:

$$\tilde{R}(i, j) = \sum_{k=-K}^{K} \sum_{l=-L}^{L} f(k, l) R(i+k, j+l) \bigg/ \sum_{k=-K}^{K} \sum_{l=-L}^{L} f(k, l),$$

where i and j represent pixel locations associated with an image or video block R, and i=0, ... ,M-1 and j=0, ... ,N-1. This disclosure proposes techniques that can reduce the number of bits needed to transmit filter coefficients f(k,l).

The filter coefficients with indices k and l such that k>0 or l>0 can be predicted from the coefficients f(k,l) for which k<=0 and l<=0 as follows, where d(k,l) represents a difference value at a given location defined by k and l:

$$f(k, l) = \begin{cases} f(-k, -l) + d(k, l) & \text{if } k > 0 \text{ and } l > 0 \\ f(-k, l) + d(k, l) & \text{if } k > 0 \text{ and } l \leq 0 \\ f(k, -l) + d(k, l) & \text{if } k \leq 0 \text{ and } l > 0 \end{cases}$$

The coefficient f(0,0) can be predicted as follows:

$$f(0, 0) = \text{normFact} - \sum_{\substack{k=-K \\ \text{except} \\ k=l=0}}^{K} \sum_{l=-L}^{L} f(k, l) + d(0, 0)$$

Filter unit 47 may first code the coefficients f(k,l) for which k=−K, . . . ,0 and l=−L, . . . ,0 and k or l are not both equal to 0. The number of bits n needed to represent the f(k,l) with largest magnitude may be coded by filter unit 47 and sent by video encoder 50, with each coefficient f(k,l) being coded and sent using n bits. Next, the coefficient magnitude difference values d(k,l) may be coded by filter unit 47 sent by video encoder 50. Again the number of bits m needed to represent the d(k,l) with largest magnitude may be sent first by video encoder 50, and then subsequently each coefficient difference d(k,l) may be sent using m bits.

The magnitude of the coefficients g(k,l) may depend on k and l values. Usually the coefficient with the biggest amplitude is the coefficient g(0,0). Moreover, the other coefficients which are expected to have large amplitudes are the coefficients for which value of k or l is equal to 0. This observation can be utilized to further reduce amount of bits needed to transmit the coefficients. In particular, the normFact used in quantization of filter coefficients can be dependent on values of k and l. Accordingly, the number of bits used to represent coefficients can be dependent on values of k and l. For example when coding and transmitting the coefficients f(k,l) for which k=−K, . . . , 0 and l=−L, . . . ,0, n bits may be used to send coefficients for which k or l equals 0, while n−1 bits may be used to send the remaining coefficients.

To even further reduce the number of bits needed to send the filter coefficients, exact symmetry may be imposed on the filter coefficients. For example, in some examples, all the filter coefficient difference values d(k,l) may be forced to be zero, thus cutting the number of filter coefficients to be sent to about one quarter of those that would otherwise be needed to send all of the filter coefficients. Alternatively, either exact horizontal or exact vertical symmetry may be imposed, thus cutting the number of filter coefficients to be sent to about one half of those that would otherwise be needed to send all of the filter coefficients.

In these examples wherein exact symmetry is imposed in the vertical dimension, horizontal dimension or vertical and horizontal dimensions, difference values may not need to be sent, but may be presumed to be zero for magnitudes. The decoding device would receive an encoded bitstream that comprises an encoded unit of the video data including a plurality of video blocks, and filter information comprising a first set of filter coefficients. In this case, the decoding device would decode the plurality video blocks, generate a second set of filter coefficients based on the first set of filter coefficients, and filter the decoded plurality of video blocks based on the first and second sets of filter coefficients.

In FIG. 4, if perfect symmetry is imposed at the encoder, the difference values associated with coefficient magnitude differences in quadrants Q2-Q4 relative to quadrant 1 may be zero, and may be presumed as such without transferring any information for the filter coefficients of quadrants Q2-Q4. The communication of difference values for magnitude differences in quadrants Q2-Q4, however, may have coding advantages by allowing the filter coefficient magnitudes of quadrants Q2-Q4 to differ slightly from those of quadrant Q1.

Figure 7:
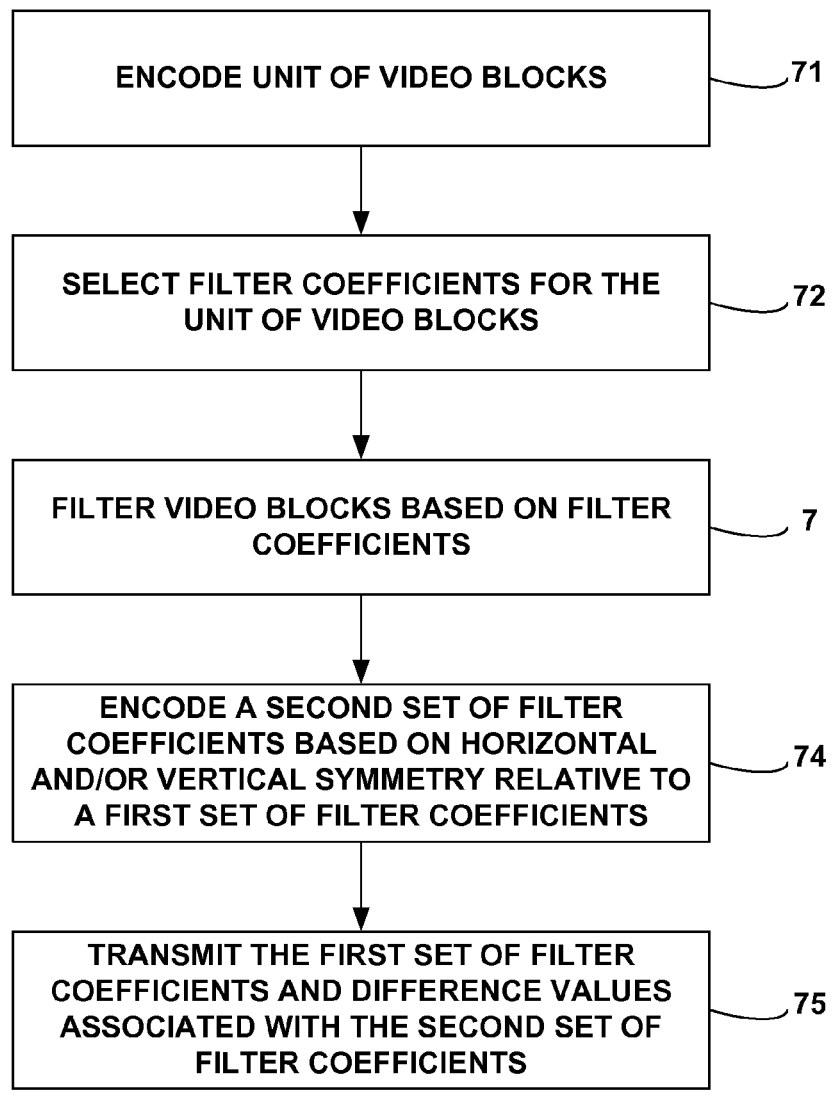
FIGS. 7 and 8 are flow diagrams illustrating exemplary encoding and decoding techniques consistent with this disclosure.

FIG. 7 is a flow diagram illustrating an encoding technique consistent with this disclosure. FIG. 7 will be described from the perspective of video encoder 50 of FIG. 2. As shown in FIG. 7, video encoder 50 encodes a unit of video blocks (71), e.g., by invoking prediction unit 32 to predictively code each of the video blocks. Filter unit 47 selects filter coefficients for the unit of video blocks (72), and filters those video blocks based on the selected filter coefficients (73). Filter unit 47 encodes a second set of filter coefficients based on horizontal and/or vertical symmetry relative to a first set of filter coefficients (74), which may include the generation of difference values for the second set of filter coefficients indicative of differences between the second set of filter coefficients and the first set of filter coefficients. Video encoder 50 then outputs the first set of filter coefficients and the difference values so that this information can be transmitted to another device (75). In particular, entropy encoding unit 46 may generate an output bitstream comprising entropy coded video blocks and entropy coded filter information that includes the first set of filter coefficients and the difference values associated with the second set of filter coefficients.

Figure 8:
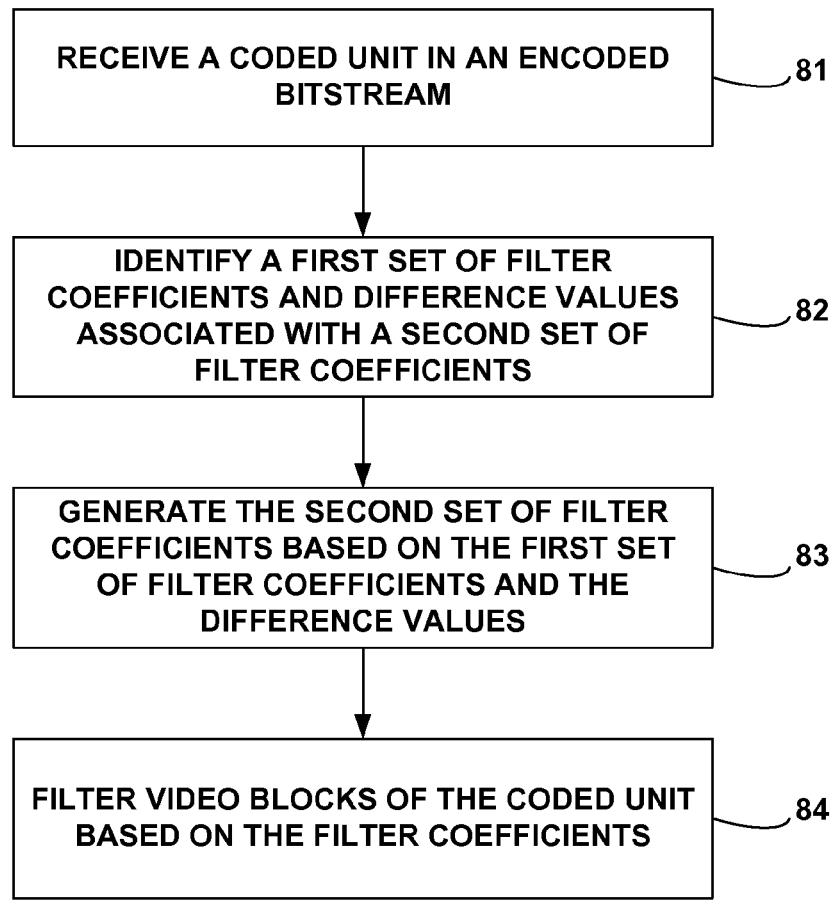

FIG. 8 is a flow diagram illustrating an encoding technique consistent with this disclosure. FIG. 8 will be described from the perspective of video decoder 60 of FIG. 3. As shown in FIG. 8, video decoder 60 receives a coded unit in an encoded bitstream (81). Entropy decoding unit 52 may decode the bitstream to generate quantized coefficients and various syntax, such as prediction syntax and filter information. Filter unit 47 receives the filter information, and identifies a first set of filter coefficients and difference values associated with a second set of filter coefficients (82). Filter unit 47 generates the second set of filter coefficients based on the first set of filter coefficients and the difference values (83). Then, filter unit 47 filters the video blocks of the coded unit based on the filter coefficients (84). Since the second set of filter coefficients are not themselves included in the bitstream, the level of compression within the bitstream may be improved. The difference values may comprise less data than the second set of filter coefficients, but given the first set of filter coefficients, the difference values can be used to generate the second set of filter coefficients as described herein.

Figure 9:
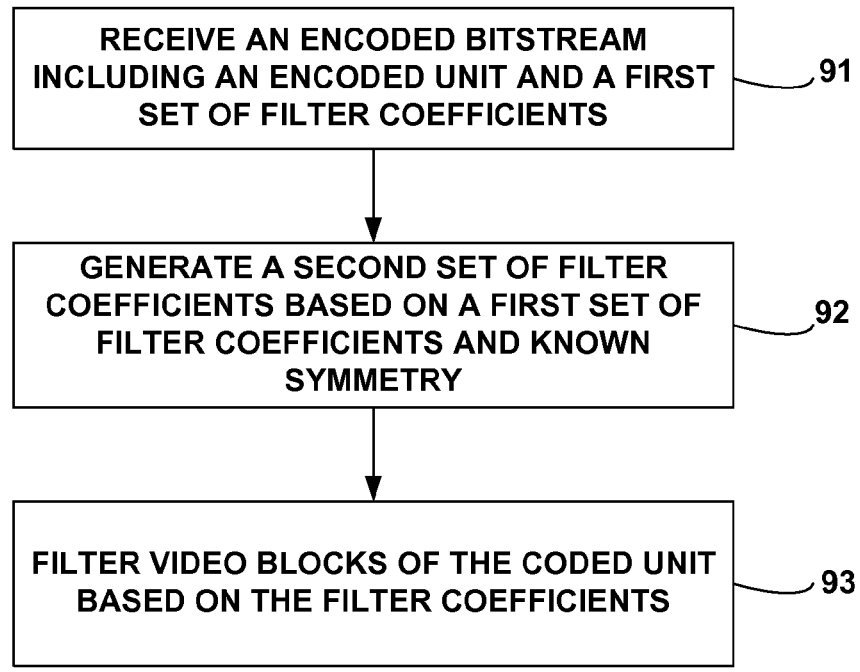
FIG. 9 is another flow diagram illustrating an exemplary decoding technique consistent with this disclosure.

FIG. 9 is a flow diagram illustrating an encoding technique consistent with this disclosure. In the example of FIG. 9, however, exact symmetry is imposed such that difference values associated with magnitude differences are assumed to be zero for the second set of filter coefficients. In this case, the second set of filter coefficients can beexcluded from the bitstream and derived at the decoder based on the first set of filter coefficients and the known symmetry. FIG. 9 will be described from the perspective of video decoder 28 of destination device 16 in FIG. 1.

As shown in FIG. 9, video decoder 28 receives an encoded bitstream including an encoded unit and a first set of filter coefficients (91). Video decoder 28 generates a second set of filter coefficients based on a first set of filter coefficients and known symmetry (92). In this case, video decoder 28 may be programmed to know that video encoder 22 imposed perfect symmetry on the filter coefficients during the encoding process. Video decoder 28 filters the video blocks of the coded unit based on the filter coefficients (93), which include both the first set that was included in the bitstream and the second set that were derived based on the first set of filter coefficients and known symmetry.

In some cases consistent with FIG. 9, the bitstream may include a simple syntax element, such as a one-bit or two-bit flag, to indicate whether perfect symmetry was imposed on the filter coefficients in the vertical and/or horizontal dimensions such that difference values may be presumed to be zero. In this case, video decoder 28 can identify symmetry or non-symmetry based on the flag, and if symmetry exists, video decoder 28 can generates a second set of filter coefficients based on a first set of filter coefficients and the known symmetry (92). The known symmetry may result in sign changes in the second set of filter coefficients relative to the first set of filter coefficients.

The techniques of this disclosure may be realized in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials.

The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of encoding video data, the method comprising:
    encoding, by an encoding device, a unit of the video data, the unit including a plurality of video blocks;
    selecting filter coefficients for filtering the video blocks of the unit of the video data, the filter coefficients including a first set and a second set;
    allocating different numbers of bits to different filter coefficients in the first set of the filter coefficients, wherein a number of bits allocated to one of the different filter coefficients is based at least in part on a location of the one of the different filter coefficients relative to an axis of symmetry between the first and second sets of filter coefficients;
    generating difference values associated with the second set of the filter coefficients based on the first set of the filter coefficients; and
    entropy coding the first set of filter coefficients that are allocated different numbers of bits and the difference values associated with the second set of the filter coefficients.

2. The method of claim 1, further comprising:
    transmitting an encoded bitstream that includes the first set of the filter coefficients and the difference values associated with the second set of the filter coefficients.

3. The method of claim 1, wherein the second set of the filter coefficients have vertical symmetry or horizontal symmetry relative to the first set of filter coefficients.

4. The method of claim 1, wherein a first subset of the second set of the filter coefficients have horizontal symmetry relative to the first set of filter coefficients and a second subset of the second set of the filter coefficients have vertical symmetry relative to the first set of filter coefficients.

5. The method of claim 1, wherein the first set of filter coefficients comprises approximately half of the filter coefficients and the second set of filter coefficients comprises approximately half of the filter coefficients.

6. The method of claim 1, wherein the first set of filter coefficients comprises approximately one quarter of the filter coefficients and the second set of filter coefficients comprises approximately three quarters of the filter coefficients.

7. The method of claim 1, wherein the filter coefficients are defined as $f(k,l)$ where k and l are horizontal and vertical components within a two-dimensional k-l space, the method further comprising allocating a greater number of bits to filter coefficients in the first set of the filter coefficients that correspond to k or l absolute values of zero relative to filter coefficients in the first set of the filter coefficients that correspond to k and l absolute values greater than zero.

8. The method of claim 1, wherein the unit of the video data comprises one of a frame, a group of pictures, a slice of a frame, and a subset of independently coded video blocks within a frame.

9. A method of decoding video data, the method comprising:
    receiving an entropy encoded bitstream and entropy decoding the entropy encoded bitstream to generate an encoded unit of the video data including a plurality of video blocks, and filter information comprising a first set of filter coefficients and difference values associated with a second set of filter coefficients, wherein different filter coefficients in the first set of the filter coefficients are represented by different numbers of bits following the entropy decoding, wherein a number of bits allocated to one of the different filter coefficients is based at least in part on a location of the one of the different filter coefficients relative to an axis of symmetry between the first and second sets of filter coefficients;
    decoding, by a decoding device, the plurality video blocks;
    generating the second set of filter coefficients based on the first set of filter coefficients and the difference values; and
    filtering the decoded plurality of video blocks based on the first and second sets of filter coefficients.

10. The method of claim 9, wherein the second set of the filter coefficients have vertical symmetry or horizontal symmetry relative to the first set of filter coefficients.

11. The method of claim 9, wherein a first subset of the second set of the filter coefficients have horizontal symmetry relative to the first set of filter coefficients and a second subset of the second set of the filter coefficients have vertical symmetry relative to the first set of filter coefficients.

12. The method of claim 9, wherein the first set of filter coefficients comprises approximately half of the filter coefficients and the second set of filter coefficients comprises approximately half of the filter coefficients.

13. The method of claim 9, wherein the first set of filter coefficients comprises approximately one quarter of the filter coefficients and the second set of filter coefficients comprises approximately three quarters of the filter coefficients.

14. The method of claim 9, wherein the first and second sets of filter coefficients are defined as f(k,l) where k and l are horizontal and vertical components within a two-dimensional k-l space, wherein a greater number of bits are allocated to filter coefficients in the first set of the filter coefficients that correspond to k or l absolute values of zero relative to filter coefficients in the first set of the filter coefficients that correspond to k and l absolute values greater than zero.

15. The method of claim 9, wherein the unit of the video data comprises one of a frame, a group of pictures, a slice of a frame, and a subset of independently coded video blocks within a frame.

16. An apparatus that encodes video data, the apparatus comprising:
a predictive coding unit that encodes a unit of the video data, the unit of the video data including a plurality of video blocks;
a filter unit that selects filter coefficients for filtering the video blocks of the unit of the video data, the filter coefficients including a first set and a second set, allocates different numbers of bits to different filter coefficients in the first set of the filter coefficients, and generates difference values associated with the second set of the filter coefficients based on the first set of the filter coefficients, wherein a number of bits allocated to one of the different filter coefficients is based at least in part on a location of the one of the different filter coefficients relative to an axis of symmetry between the first and second sets of filter coefficients; and
an entropy coding unit that entropy codes the first set of filter coefficients that are allocated different numbers of bits and the difference values associated with the second set of the filter coefficients.

17. The apparatus of claim 16, further comprising:
the entropy coding unit that generates an encoded bitstream that includes the first set of the filter coefficients and the difference values associated with the second set of the filter coefficients.

18. The apparatus of claim 16, wherein the second set of the filter coefficients have vertical symmetry or horizontal symmetry relative to the first set of filter coefficients.

19. The apparatus of claim 16, wherein a first subset of the second set of the filter coefficients have horizontal symmetry relative to the first set of filter coefficients and a second subset of the second set of the filter coefficients have vertical symmetry relative to the first set of filter coefficients.

20. The apparatus of claim 16, wherein the first set of filter coefficients comprises approximately half of the filter coefficients and the second set of filter coefficients comprises approximately half of the filter coefficients.

21. The apparatus of claim 16, wherein the first set of filter coefficients comprises approximately one quarter of the filter coefficients and the second set of filter coefficients comprises approximately three quarters of the filter coefficients.

22. The apparatus of claim 16, wherein the filter unit defines the filter coefficients as f(k,l) where k and l are horizontal and vertical components within a two-dimensional k-l space, wherein the filter unit allocates a greater number of bits to filter coefficients in the first set of the filter coefficients that correspond to k or l absolute values of zero relative to filter coefficients in the first set of the filter coefficients that correspond to k and l absolute values greater than zero.

23. The apparatus of claim 16, wherein the unit of the video data comprises one of a frame, a group of pictures, a slice of a frame, and a subset of independently coded video blocks within a frame.

24. The apparatus of claim 16, wherein the apparatus comprises an integrated circuit.

25. The apparatus of claim 16, wherein the apparatus comprises a microprocessor.

26. An apparatus that decodes video data, the apparatus comprising:
an entropy unit that receives an encoded bitstream, the encoded bitstream and entropy decodes the entropy encoded bitstream to generate an encoded unit of the video data including a plurality of video blocks, and filter information comprising a first set of filter coefficients and difference values associated with a second set of filter coefficients, wherein different filter coefficients in the first set of the filter coefficients are represented by different numbers of bits following the entropy decoding, wherein a number of bits allocated to one of the different filter coefficients is based at least in part on a location of the one of the different filter coefficients relative to an axis of symmetry between the first and second sets of filter coefficients;
a prediction unit that decodes the plurality video blocks; and
a filter unit that generates the second set of filter coefficients based on the first set of filter coefficients and the difference values, and filters the decoded plurality of video blocks based on the first and second sets of filter coefficients.

27. The apparatus of claim 26, wherein the entropy unit that entropy decodes the bitstream to generate the plurality of video blocks and the filter information.

28. The apparatus of claim 26, wherein the second set of the filter coefficients have vertical symmetry or horizontal symmetry relative to the first set of filter coefficients.

29. The apparatus of claim 26, wherein a first subset of the second set of the filter coefficients have horizontal symmetry relative to the first set of filter coefficients and a second subset of the second set of the filter coefficients have vertical symmetry relative to the first set of filter coefficients.

30. The apparatus of claim 26, wherein the first set of filter coefficients comprises approximately half of the filter coefficients and the second set of filter coefficients comprises approximately half of the filter coefficients.

31. The apparatus of claim 26, wherein the first set of filter coefficients comprise approximately one quarter of the filter coefficients and the second set of filter coefficients comprise approximately three quarters of the filter coefficients.

32. The apparatus of claim 26, wherein the first and second sets of filter coefficients are defined as f(k,l) where k and l are horizontal and vertical components within a two-dimensional k-l space, wherein a greater number of bits are allocated to filter coefficients in the first set of the filter coefficients that correspond to k or l absolute values of zero relative to filter coefficients in the first set of the filter coefficients that correspond to k and l absolute values greater than zero.

33. The apparatus of claim 26, wherein the unit of the video data comprises one of a frame, a group of pictures, a slice of a frame, and a subset of independently coded video blocks within a frame.

34. A non-transitory computer-readable medium comprising instructions that upon execution in a video coding device cause the device to encode video data, wherein the instructions cause the device to:

encode a unit of the video data, the unit including a plurality of video blocks;

select filter coefficients for filtering the video blocks of the unit of the video data, the filter coefficients including a first set and a second set;

allocate different numbers of bits to different filter coefficients in the first set of the filter coefficients, wherein a number of bits allocated to one of the different filter coefficients is based at least in part on a location of the one of the different filter coefficients relative to an axis of symmetry between the first and second sets of filter coefficients;

generate difference values associated with the second set of the filter coefficients based on the first set of the filter coefficients; and entropy code the first set of filter coefficients that are allocated different numbers of bits and the difference values associated with the second set of the filter coefficients.

35. The computer-readable medium of claim 34, wherein the instructions cause the device to generate an entropy coded bitstream that includes the first set of the filter coefficients and the difference values associated with the second set of the filter coefficients.

36. The computer-readable medium of claim 34, wherein the filter coefficients are defined as f(k,l) where k and l are horizontal and vertical components within a two-dimensional k-l space, wherein the instructions cause the device to allocate a greater number of bits to filter coefficients in the first set of the filter coefficients that correspond to k or l absolute values of zero relative to filter coefficients in the first set of the filter coefficients that correspond to k and l absolute values greater than zero.

37. A non-transitory computer-readable medium comprising instructions that upon execution in a video coding device cause the device to decode video data, wherein the instructions cause the device to:

receive an entropy encoded bitstream and entropy decoding the entropy encoded bitstream to generate an encoded unit of the video data including a plurality of video blocks, and filter information comprising a first set of filter coefficients and difference values associated with a second set of filter coefficients, wherein different filter coefficients in the first set of the filter coefficients are represented by different numbers of bits following the entropy decoding, wherein a number of bits allocated to one of the different filter coefficients is based at least in part on a location of the one of the different filter coefficients relative to an axis of symmetry between the first and second sets of filter coefficients;

decode the plurality video blocks;

generate the second set of filter coefficients based on the first set of filter coefficients and the difference values; and filter the decoded plurality of video blocks based on the first and second sets of filter coefficients.

38. The computer-readable medium of claim 37, wherein the first and second sets of filter coefficients are defined as f(k,l) where k and l are horizontal and vertical components within a two dimensional k-l space, wherein a greater number of bits are allocated to filter coefficients in the first set of the filter coefficients that correspond to k or l absolute values of zero relative to filter coefficients in the first set of the filter coefficients that correspond to k and l absolute values greater than zero.

39. A device that encodes video data, the device comprising:

means for encoding a unit of the video data, the unit including a plurality of video blocks;

means for selecting filter coefficients for filtering the video blocks of the unit of the video data, the filter coefficients including a first set and a second set;

means for allocating different numbers of bits to different filter coefficients in the first set of the filter coefficients, wherein a number of bits allocated to one of the different filter coefficients is based at least in part on a location of the one of the different filter coefficients relative to an axis of symmetry between the first and second sets of filter coefficients;

means for generating difference values associated with the second set of the filter coefficients based on the first set of the filter coefficients; and means for entropy coding the first set of filter coefficients that are allocated different numbers of bits and the difference values associated with the second set of the filter coefficients.

40. The device of claim 39, further comprising:

means for transmitting an encoded bitstream that includes the first set of the filter coefficients and the difference values associated with the second set of the filter coefficients.

41. The device of claim 39, wherein the filter coefficients are defined as f(k,l) where k and l are horizontal and vertical components within a two-dimensional k-l space, wherein means for allocating allocates a greater number of bits to filter coefficients in the first set of the filter coefficients that correspond to k or l absolute values of zero relative to filter coefficients in the first set of the filter coefficients that correspond to k and l absolute values greater than zero.

42. A device that decodes video data, the device comprising:

means for receiving an entropy encoded bitstream and means for entropy decoding the entropy encoded bitstream to generate an encoded unit of the video data including a plurality of video blocks, and filter information comprising a first set of filter coefficients and difference values associated with a second set of filter coefficients, wherein different filter coefficients in the first set of the filter coefficients are represented by different numbers of bits following the entropy decoding, wherein a number of bits allocated to one of the different filter coefficients is based at least in part on a location of the one of the different filter coefficients relative to an axis of symmetry between the first and second sets of filter coefficients;

means for decoding the plurality video blocks;

means for generating the second set of filter coefficients based on the first set of filter coefficients and the difference values; and means for filtering the decoded plurality of video blocks based on the first and second sets of filter coefficients.

43. The device of claim 42, wherein the means for entropy decoding decodes the bitstream to generate the plurality of video blocks and the filter information.

44. The device of claim 42, wherein the first and second sets of filter coefficients are defined as f(k,l) where k and l are horizontal and vertical components within a two-dimensional k-l space, wherein a greater number of bits are allocated to filter coefficients in the first set of the filter coefficients that correspond to k or l absolute values of zero relative to filter coefficients in the first set of the filter coefficients that correspond to k and l absolute values greater than zero.

45. A device for encoding video data comprising:
- a predictive coding unit that encodes a unit of the video data, the unit of the video data including a plurality of video blocks;
- a filter unit that selects filter coefficients for filtering the video blocks of the unit of video data, the filter coefficients including a first set and a second set, allocates different numbers of bits to different filter coefficients in the first set of the filter coefficients, and generates difference values associated with the second set of the filter coefficients based on the first set of the filter coefficients, wherein a number of bits allocated to one of the different filter coefficients is based at least in part on a location of the one of the different filter coefficients relative to an axis of symmetry between the first and second sets of filter coefficients;
- an entropy coding unit that entropy codes the first set of filter coefficients that are allocated different numbers of bits and the difference values associated with the second set of the filter coefficients; and
- a wireless transmitter that transmits an encoded bitstream that includes the first set of the filter coefficients and the difference values associated with a second set of the filter coefficients.

46. The device of claim 45, wherein the device comprises a wireless communication handset.

47. A device for decoding video data comprising:
- a wireless receiver that receives an entropy encoded bitstream comprising an encoded unit of video data including a plurality of video blocks, and filter information comprising a first set of filter coefficients and difference values associated with a second set of filter coefficients;
- an entropy decoding unit that receives the entropy encoded bitstream from the wireless receiver and entropy decodes the entropy encoded bitstream to generate the plurality of video blocks and the filter information, wherein different filter coefficients in the first set of the filter coefficients are represented by different numbers of bits following the entropy decoding, wherein a number of bits allocated to one of the different filter coefficients is based at least in part on a location of the one of the different filter coefficients relative to an axis of symmetry between the first and second sets of filter coefficients;
- a prediction unit that decodes the plurality video blocks; and
- a filter unit that generates the second set of filter coefficients based on the first set of filter coefficients and the difference values, and filtering the decoded plurality of video blocks based on the first and second sets of filter coefficients.

48. The apparatus of claim 47, wherein the device comprises a wireless communication handset.

49. A method of decoding video data, the method comprising:
- receiving an entropy encoded bitstream and entropy decoding the entropy encoded bitstream to generate an encoded unit of the video data including a plurality of video blocks, and filter information comprising a first set of filter coefficients, wherein different filter coefficients in the first set of the filter coefficients are represented by different numbers of bits following the entropy decoding, wherein a number of bits allocated to one of the different filter coefficients is based at least in part on a location of the one of the different filter coefficients relative to an axis of symmetry between the first and second sets of filter coefficients;
- decoding the plurality video blocks;
- generating a second set of filter coefficients based on the first set of filter coefficients; and
- filtering the decoded plurality of video blocks based on the first and second sets of filter coefficients.

50. The method of claim 49, wherein the second set of filter coefficients have vertical symmetry relative to the first set of filter coefficients.

51. The method of claim 49, wherein the second set of filter coefficients have horizontal symmetry relative to the first set of filter coefficients.

52. The method of claim 49, wherein the second set of filter coefficients have horizontal and vertical symmetry relative to the first set of filter coefficients.

53. The method of claim 49, wherein the encoded bitstream includes syntax that identifies symmetry between the first set of filter coefficients and the second set of coefficients.

54. An apparatus that decodes video data, the apparatus comprising:
- an entropy unit that receives an entropy encoded bitstream and entropy decodes the entropy encoded bitstream to generate an encoded unit of the video data including a plurality of video blocks, and filter information comprising a first set of filter coefficients, wherein different filter coefficients in the first set of the filter coefficients are represented by different numbers of bits following the entropy decoding, wherein a number of bits allocated to one of the different filter coefficients is based at least in part on a location of the one of the different filter coefficients relative to an axis of symmetry between the first and second sets of filter coefficients;
- a predictive coding unit that decodes the plurality video blocks; and
- a filter unit that generates a second set of filter coefficients based on the first set of filter coefficients, and filters the decoded plurality of video blocks based on the first and second sets of filter coefficients.

55. The apparatus of claim 54, wherein the second set of filter coefficients has horizontal symmetry, vertical symmetry, or horizontal and vertical symmetry relative to the first set of filter coefficients.

56. The apparatus of claim 54, wherein the bitstream includes syntax that identifies symmetry between the first set of filter coefficients and the second set of coefficients.

57. The apparatus of claim 54, wherein the apparatus comprises an integrated circuit.

58. The apparatus of claim 54, wherein the apparatus comprises a microprocessor.

59. A device for decoding video data comprising:
- means for receiving an entropy encoded bitstream and entropy decoding the entropy encoded bitstream to generate an encoded unit of the video data including a plurality of video blocks, and filter information comprising a first set of filter coefficients, wherein different filter coefficients in the first set of the filter coefficients are represented by different numbers of bits following the entropy decoding, wherein a number of bits allocated to one of the different filter coefficients is based at least in part on a location of the one of the different filter coefficients relative to an axis of symmetry between the first and second sets of filter coefficients;
- means for decoding the plurality video blocks;
- means for generating a second set of filter coefficients based on the first set of filter coefficients; and
- means for filtering the decoded plurality of video blocks based on the first and second sets of filter coefficients.

60. The device of claim 59, wherein the second set of filter coefficients has horizontal symmetry, vertical symmetry, or horizontal and vertical symmetry relative to the first set of filter coefficients.

61. The device of claim 59, wherein the bitstream includes syntax that identifies symmetry between the first set of filter coefficients and the second set of coefficients.

62. A non-transitory computer-readable medium comprising instructions that upon execution cause a decoding device to
receive an entropy encoded bitstream and entropy decoding the entropy encoded bitstream to generate an encoded unit of the video data including a plurality of video blocks, and filter information comprising a first set of filter coefficients, wherein different filter coefficients in the first set of the filter coefficients are represented by different numbers of bits following the entropy decoding, wherein a number of bits allocated to one of the different filter coefficients is based at least in part on a location of the one of the different filter coefficients relative to an axis of symmetry between the first and second sets of filter coefficients;
decode the plurality video blocks;
generate a second set of filter coefficients based on the first set of filter coefficients; and
filter the decoded plurality of video blocks based on the first and second sets of filter coefficients.

63. The computer-readable medium of claim 62, wherein the second set of filter coefficients has horizontal symmetry, vertical symmetry, or horizontal and vertical symmetry relative to the first set of filter coefficients.

64. The computer-readable medium of claim 62, wherein the bitstream includes syntax that identifies symmetry between the first set of filter coefficients and the second set of coefficients.

* * * * *